United States Patent [19]
Pollinger et al.

[11] 3,881,785
[45] May 6, 1975

[54] LOAD RESPONSIVE AIR BRAKE SYSTEM FOR VEHICLES INCLUDING A SPRING-LOADED CYLINDER

[75] Inventors: Hans Pollinger, Munich; Karlheinz Splanemann, Grobenzell, both of Germany

[73] Assignee: Knorr-Bremse GmbH, Munich, Germany

[22] Filed: Apr. 3, 1974

[21] Appl. No.: 457,641

[30] Foreign Application Priority Data
Apr. 3, 1973  Germany............................ 2316587

[52] U.S. Cl............................................. 303/22 R
[51] Int. Cl............................................. B60t 8/22
[58] Field of Search............ 303/6 C, 6 R, 20, 22 A, 303/22 R, 23 A, 23 R

[56] References Cited
UNITED STATES PATENTS
| | | | |
|---|---|---|---|
| 2,458,965 | 1/1949 | Sudduth............................ | 303/22 R |
| 2,534,622 | 12/1950 | Pickert............................. | 303/22 R |
| 2,720,428 | 10/1955 | Erson................................ | 303/22 R |

*Primary Examiner*—Duane A. Reger
*Attorney, Agent, or Firm*—Edmund M. Jaskiewicz

[57] ABSTRACT

A load responsive air brake system has a load brake valve connected to a main air line and to a spring-loaded cylinder. In the load brake valve are two control pistons which act upon a beam balanced upon a fulcrum which is displaceable in response to the load upon the vehicle. The pressure in a control reservoir connected to the main air line acts upon the corresponding sides of the control pistons and the other side of one control piston is acted upon by the spring loaded cylinder and the other side of the other piston is acted upon by a pressure proportional to the degree of braking.

6 Claims, 1 Drawing Figure

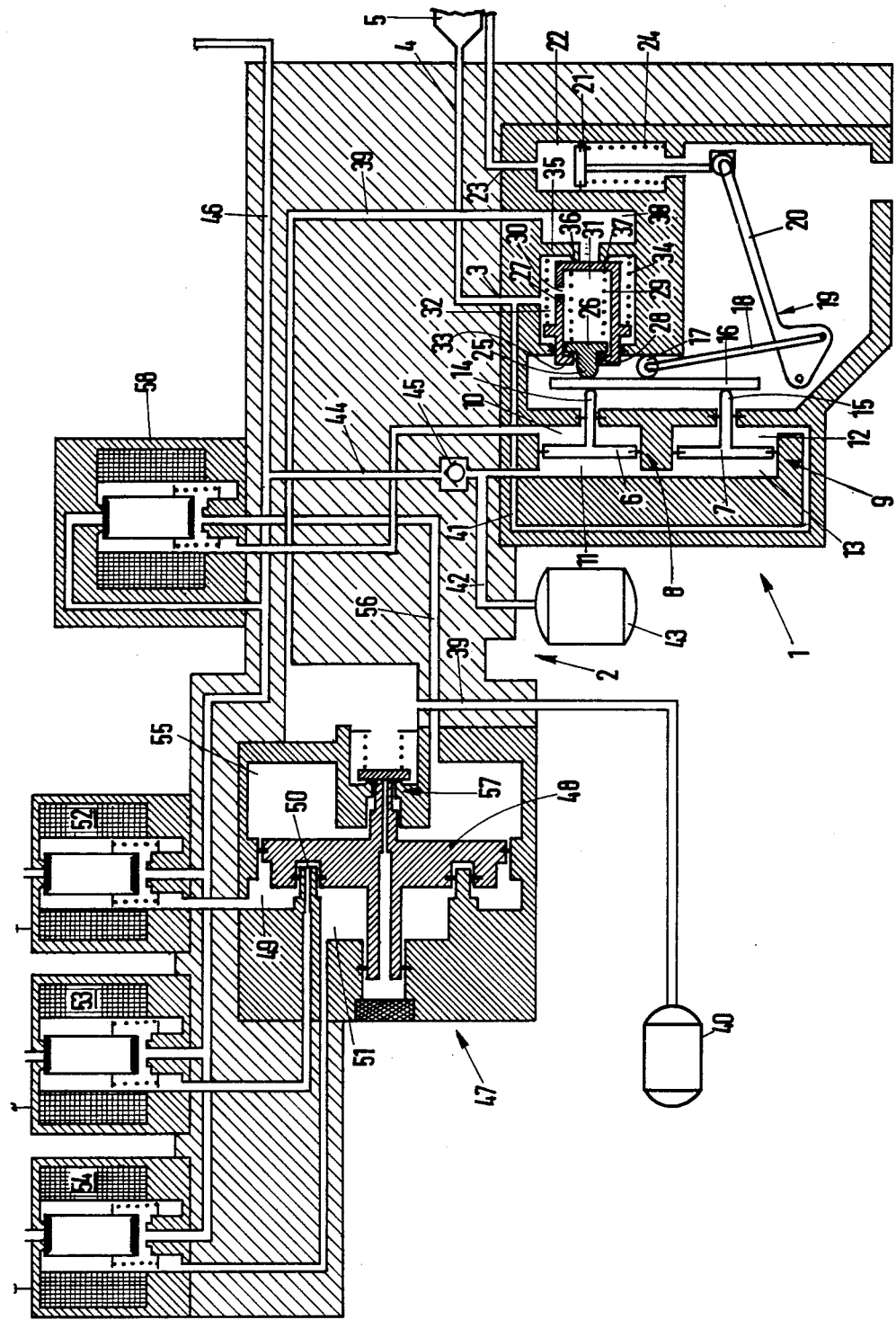

LOAD RESPONSIVE AIR BRAKE SYSTEM FOR VEHICLES INCLUDING A SPRING-LOADED CYLINDER

The present invention relates to a load responsive air brake system for vehicles such as railway vehicles, more particularly, to such a system having a load brake valve which functions both to regulate the vehicle load and to control braking.

It has been known to provide a load responsive air brake system for railway vehicles comprising a spring-loaded cylinder whose piston is acted upon by a load responsive release pressure so that the cylinder is moved from a braking position into a release position against the force of a spring. The release pressure is produced by a load brake valve connected before the spring-loaded cylinder and is operated by means of the air pressure in the main air line. The load brake valve comprises two control pistons which act upon a beam balanced upon a fulcrum displaceable as a function of the load of the vehicle.

Such brake systems are also generally provided with a control valve preferably in the form of a four-pressure valve connected either before or after the load brake valve. At least one control piston surface of the control valve is subjected to the action of the air pressure produced by the load brake valve. At least one control piston surface of the control valve is subjected to the action of the air pressure produced by the load brake valve. This additional control valve is necessary in such known brake systems in order to obtain the same release pressure in the spring loaded cylinder in the release position of the brake both when the vehicle is empty and when the vehicle is fully loaded. The separate control piston surfaces of the control valve must be adjusted precisely to each other in this respect. Accordingly, the necessity of providing such control valve significantly increases the structure and complexity of the brake system and thus considerably increases the cost of manufacuture.

It is therefore the principal object of the present invention to provide such an air brake system as referred to above which does not require addition control valve.

It is another object of the present invention to provide such an air brake system which has a simple and inexpensive structure which is reliable and precise in operation.

According to one aspect of the present invention a load responsive air brake system particularly for railway vehicles but which may be used in other vehicles may comprise a load brake valve connected to a main air line and also connected to a spring loaded cylinder having a piston actuable by a load responsive release pressure against the force of its spring. Within the load brake valve there are provided first and second control pistons acting upon a beam balanced upon a fulcrum which is displaceable in response to the load on the vehicle. A control reservoir connected to the main air line through a check valve acts upon the head ends of the control pistons. The rod end of the second piston is acted upon by the signal loaded cylinder and the rod end of the first piston is acted upon a pressure proportional to the degree of braking through a pressure reducing valve connected to the main air line. Because of the pressures acting upon the control pistons, the load brake valve performs a dual function, namely load regulation and braking control. The release pressure in the spring-loaded cylinder is thus automatically the same in the release position of the brake whether the vehicle is empty or loaded. The release pressure in the release position of the brake can be infinitely adjusted to any desired value by changing the pressure of air in the main air line. The pressure reducing valve is employed primarily when the brake system is to be controlled from the operator's control panel either purely pneumatically or electrically.

Other objects and advantages of the present invention will be readily apparent upon reference to the accompanying description when taken in conjunction with the following drawing, which is exemplary, which shows schematically a load responsive air brake system according to the present invention.

As may be seen in the drawing, the air brake system comprises an automatically controllable load brake valve 1 mounted upon a carrier or frame element 2 and connected by ducts 3 and 4 in the carrier element 2 to a spring-loaded cylinder 5.

Within the valve 1 there are two control pistons 6 and 7 axially and sealingly displaceable in cylinder housings 8 and 9, respectively. Cylinder 8 is provided with chambers 10 and 11 on opposite sides of piston 6 and in a similar manner cylinder 9 is provided with chambers 12 and 13 on opposite sides of piston 7. The pistons 6 and 7 are provided with rods 14 and 15 that push upon the ends of a beam 16 balanced upon a displaceable fulcrum in the form of a roller 17 on the side of the beam away from the rods 14, 15. The pistons 6 and 7 are of the same size so that the head surfaces of the pistons acted upon by air pressure in chambers 11 and 13 are the same in area and, correspondingly, the rod surfaces of the pistons acted upon by the pressures in chambers 10 and 12 are also equal in area.

The roller 17 is pivotably mounted on the end of a rod 18 of crank linkage indicated generally at 19 and comprising a crank arm 20 having one end pivotably mounted upon a fixed pivot and the other end pivotably connected to the piston rod of a piston 21 which is axially and sealingly displaceable in a cylinder 22. The piston 21 is acted upon by a load responsive control pressure supplied to the load brake valve 1 through a control input passage 23 against the force of a restoring spring 24 in the cylinder chamber 22. The load responsive control pressure is produced in a known manner by a relay valve whose structure is known in the art and is not shown in the drawing.

Laterally of the roller 17 there is provided a push rod 25 which is opposed from push rod 14 of piston 16 and similarly acting upon the balance beam 16. The push rod 25 have a valve disk 26 on its end away from the beam 16.

The valve disk 26 is mounted in a sleeve 27 which is provided with a valve seat 28 surrounding an opening in sleeve 27 through which passes push rod 25. The valve disk 26 together with valve seat 28 thus defines an outlet valve to the atmosphere. A spring 29 has one end acting on valve disk 26 and its other end acting upon an inner end surface of sleeve 27. The chamber 32 is provided with an end wall 33 (at the left in the drawing) having an opening therethrough within which the sleeve 27 is sealed and axially displaceable. The outer surface of sleeve 27 is provided with a flange against which acts one end of a spring 34 positioned in the chamber 32. The other end of spring 34 acts upon right end wall 35 of the chamber 32. The end wall 35 is provided with an opening surrounded by a valve seat 36 which together with end surface 37 of sleeve 27 defines an inlet valve for the chamber 32. In the closed position, the inlet valve 36, 37 separates chamber 32 from a chamber 38.

In the drawing, the beam 16, outlet valve 26, 28 and also inlet valve 36, 37 are shown in their normal or closed positions wherein the interior 31 of sleeve 27 and chamber 32 are closed off from the atmosphere and from chamber 38. The spring 29 is constructed to have a greater strength than spring 34 so that spring 34 is unable to open inlet valve 36, 37 against the force of spring 29.

The chamber 38 is connected through an air duct or passage 39 in carrier element 2 to an air reservoir 40 employed as a source of compressed air. The chamber 32 which is connected by an air duct 41 to chamber 12 in cylinder 9. The chambers 11 and 12 on the head ends of control pistons 6 and 7 away from balance beam 16 are connected by an air duct 42 to a control reservoir 43 having a constant working pressure therein. A conduit 44 branching off from duct 42 has therein a check valve 45 opening toward control reservoir 43 and connects to the main air line 46 used as the air brake line so that the level of the working pressure in control reservoir 43 is at least substantially equal to the full pressure of main air line 46.

A known overload protection device, which is not shown in the drawing, may be provided for control reservoir 43 to bypass the check valve 45.

Chamber 10 on the side of piston 6 facing beam 16 is also connected to the main air line 46 through a pressure reducing valve 47. The pressure reducing valve 47 can be operated electrically from the operator's control panel of the vehicle in order to change its pressure reducing effect. When the valve is not electrically actuated so as to be in the non-operated state, its pressure reducing effect is zero so that the entire pressure of the main air line 46 is transmitted by the valve 47 and the ratio of the pressure transmitted by the valve 47 of 1:1.

The pressure reducing valve 47 comprises a control piston 48 having on one side thereof three separate and therefore individual chambers 49, 50 and 51. Each of these chambers is connected to solenoid valves 52, 53 and 54, respectively. When the solenoid valves are not energized, the valves maintain the chambers 49, 50 and 51 in connection to the main air line 46. Upon being electrically energized, the solenoid valves 52, 53 and 54 will close the chambers 49, 50 and 51 from the main air line 46 and open them to the atmosphere.

On the side of control piston 48 away from chambers 49, 50 and 51 there is a chamber 55 which is connected by means of a passage 56 to chamber 10 in the load brake valve 1.

A double valve 57 is provided to control the action of compressed air on chamber 55. Through double valve 57, the chamber 55 can be connected in a known manner either to the atmosphere or to a source of compressed air. In this respect, the reservoir 40 is also used as a source of compressed air for chamber 55.

In parallel with pressure reducing valve 47, there is provided a further solenoid valve 58 connected between main air line 46 and the passage 56. The coil of solenoid valve 58 is connected to the electrical brake control circuit of the vehicle. On actuation of the electrical control circuit the winding of solenoid valve will be energized and the valve 58 will bypass pressure reducing valve 47 so as to separate chamber 55 from load brake valve 1. A direct flow of the compressed air is thus established from main air line 46 to chamber 10 of the load brake valve 1.

The operation of the above described load responsive air brake system is as follows:

When the brake system is operational and the brake is in the released position the automatic main air line 46 will be charged to its full pressure level. This pressure level which is slightly reduced by the hold back pressure of check valve 45 also appears as working pressure level $P_A$ in the control reservoir 43 which is connected to the main air line 46 through check valve 45. The pressure $P_{HL}$ of the main air line 46 will thus be fully transmitted through pressure reducing valve 47 at a ratio 1:1. The full pressure of line 46 will also appear in chamber 10 of valve 1. Since the presence of piston push rod 14 reduces somewhat the area on the side of piston 6 directed toward beam 16 with respect to the piston area away from beam 16 and since the pressure in control reservoir 43 is reduced by the hold back pressure of check valve 45, the reduction of area of the rod end of piston 6 is compensated by the reduction of pressure by check valve 45 and piston 6 will be in equilibrium and will not exert any force on beam 16. The valve 45 is so selected that its hold back pressure $P_R$ has a relationship to the pressure $P_{HL}$ of main air line 46 at least substantially as a difference of the piston surfaces $F_1$ facing chamber 11 and $F_2$ facing chamber 10 to the piston surface $F_1$ subjected to the action of control reservoir pressure $P_A$ in accordance with $P_R = (F_1 - F_2): F_1 \times P_A$.

In order to obtain the illustrated equilibrium position of balance beam 16 in which outlet valve 26, 28 and inlet valve 36, 37 are closed, piston 7 also will not exert any force on balance beam 16 similar to piston 6. The pressure in chamber 12 thus equals the pressure in chamber 10, and is equal to the pressure $P_{HL}$ of the air main. Since chamber 12 is connected through ducts 41 and 4 to spring-loaded cylinder 5, a release pressure equalling the pressure of the air main will be established in the spring-loaded cylinder. By a suitable adjustment of the operator's brake valve to monitor the action of compressed air on the air main, the full pressure of the air main and, accordingly, the release pressure can be set in spring-loaded cylinder 5 precisely to just overcome the force of the storage spring of the spring-loaded cylinder and the spring-loaded cylinder is thus released. However, this will occur without the appearance of an excessive pressure in the spring-loaded cylinder.

This adjustment is fully independent of the position of roller 17 and of the two lever-arm-lengths of balance beam 16 of load-brake valve 1 with respect to control pistons 6 and 7.

A pressure is produced on a pressure medium in a known manner by a relay valve (that is not illustrated) such that the pressure is to the load of the vehicle. This pressure appears at control input 23 of load-brake valve 1 independently of the pressure of the air main and will hold piston 21 in a certain position of equilbrium against the force of spring 24. The position of roller 17 and, thus the position of the fulcrum of balance beam 16 is thus determined through crank linkage 19 pivotally connected to piston 21. The ratio of crank linkage 19 is selected such that, dependent on the position of piston 21 the length of the lever arm of balance beam 16 associated with control piston 6 can be smaller than or at most equal to the length of the lever arm associated with control piston 7. Identical lever-arm-lengths will occur upon the maximum load of the vehicle.

When the vehicle is fully loaded, fulcrum roller 17 will assume its central position, i.e., the lever arms of balance beam 16 are equal in length. If braking should be now initiated pneumatically, the pneumatic pressure in air main 46 is lowered in accordance with the desired brake stage, or degree of braking by means of the operator's brake valve that is not illustrated. This will upset the equilibrium of forces acting upon control piston 6, since the pressure in cylinder chamber 10 is reduced in accordance with the pressure in the air main 46, and balance beam 16 is pivoted under the effect of the pressure difference between admission chambers 11 and 10, in a clockwise direction. Push rod 25 will lift valve plate 26 from valve seat 28. As a result, interior 31 of sleeve 27, through opening 30, chamber 32 and, accordingly, spring-loaded cylinder 5 and admission chamber 12 are vented to the atmosphere, until the pressure forces exerted by two control pistons 6 and 7 on balance beam 16 are again equal. This will occur because of the decrease of pressure in admission chamber 12, i.e., until the pneumatic pressure appearing in admission chamber 12 and in spring-loaded cylinder 5 equals the control pressure appearing in cylinder chamber 10 and corresponds to the pressure of air main 46. Control pistons 6 and 7 are then no longer able to exert a pivoting torque on balance beam 16, so that under the action of spring 29 outlet valve 26, 28 is closed again and the venting of spring-loaded cylinder 5 is completed. This produces a brake-actuation force which consists of the difference between the initial tension of its storage spring and the load-responsive pneumatic pressure appearing in the spring-loaded cylinder.

If a full braking was initiated on the operator's brake valve, i.e., the pressure in air main 46 was lowered to the atmospheric pressure, the pneumatic pressure of spring-loaded cylinder 5 would also lower to atmospheric pressure, since outlet valve 25, 26 is closed again only when the pressure in admission chamber 12 equals the pressure in cylinder chamber 10 corresponding to the pressure of the air main. Spring-loaded cylinder 5 thus produces a maximum force of brake actuation.

It is also possible to use the operator's brake valve such that, in the case of full braking, the pressure of the air main is lowered to a certain higher valve rather than to atmospheric pressure. An operator's brake valve of this kind requires only a different range of displacement of roller 17 along balance beam 16.

At an intermediate vehicle load between empty and full load, roller 17 is pushed from its central position by means of the load-responsive control pressure appearing at control input 23 of load-brake valve 1, through piston 21 and crank linkage 19, so that the lever arm of balance beam 16 associated with control piston 6 is smaller than the lever arm associated with control piston 7. As already described above, such a lever arm ratio has no effect on the pneumatic pressure in the spring-loaded cylinder 5 when air main 46 is fully charged, i.e., when the brake is released.

If in partially loaded vehicle the pressure of the air main 46 is lowered in accordance with the desired brake stage, to initiate a braking operation, the pressure difference between the constant pressure of control reservoir 43 appearing in cylinder chamber 11 and the control pressure in admission chamber 10 again becomes effective on control piston 6 and outlet valve 26, 28 is opened in the manner described above. The pneumatic pressure is spring-loaded cylinder 5 and in admission chamber 12 is now reduced until the moments of forces acting on balance beam 16 by means of control pistons 6 and 7 on both sides of roller 17 are again equalized. However, since control piston 7 must in this state of equilibrium be less than that exerted by control piston 6 on balance beam 16 and determined by the difference of pressures in admission chambers 11 and 10. Therefore, the pneumatic pressure in admission chamber 12 and then in spring-loaded cylinder 5 in the equilibrium state of balance beam 16, wherein both inlet valve 36, 37 and also outlet valve 26, 28 are closed, must be greater than the control pressure in chamber 10. The pneumatic pressure appearing in spring-loaded cylinder 5 at the same braking stage is thus greater in the case of a partial load than in the case of full load of the vehicle. This means that the storage spring can exert its effect to a lesser extent. A certain residual pressure will remain in spring-loaded cylinder 5 even in the case of full braking. The magnitude of such residual pressure or of the pressure difference in comparison with the full load of the vehicle depends on the ratio of the lever-arm lengths of balance beam 16. The smaller the load of the vehicle and, thus the lever-arm length associated with control piston 6, the greater the residual pressure remaining in the spring-loaded cylinder 5 in the case of a full braking, so that with an identical brake stage, the smaller the vehicle load the smaller the brake actuation force exerted by spring-loaded cylinder 5.

When air main 46 is damaged, such as would occur because of an unintentional separation of several connected cars of a train, the pressure in the air main is reduced automatically to the atmospheric pressure and the vehicles are braked as in the case of full braking described above.

As already discussed, pressure-reducing valve 47 preceding admission chamber 10 of load-brake valve 1 does not exert any effect in connection with the just-described pneumatic introduction of the desired brake stage through air main 46 since it transmits the air main pressure at the ratio of 1:1. Pressure reducing valve 47 provides the possibility of controlling the compressed air brake system also electrically.

In the case of electric control, one of solenoid valves 52, 53, 54 is opened in known manner in accordance with the desired braking stage or a number of such solenoid valves is opened simultaneously. The solenoid valves will therefore reverse separate respective admission chambers 49, 50, 51 of piston 48 (associated with the valves) from air main 46 and connect such chambers to the atmosphere. This upsets the equilibrium of forces until piston 48 and double valve 47 is actuated, to introduce a new pressure into chamber 55, which new pressure establishes a new equilibrium of forces on piston 48. This pressure is established through air passage 56 also in admission chamber 10 of the load-brake valve, which then works in the manner described above as in the case of pneumatic control.

It is pointed out that an electrically infinitely variable pressure reducing valve may also be employed in place of the illustrated digitally-electrically controllable pressure reducing valve 47.

The practical control of the compressed air brake system under normal operating conditions may be effected electrically through pressure-reducing valve 47 and the pneumatic control through air main 46 may be used only in the case of power failure.

If the vehicle is braked by means of an electric brake which is not illustrated, a simultaneously effective electric control of the brake system through pressure-reducing valve 47 is not possible, since in this case solenoid valve 58 bridges over pressure-reducing valve 47 by shutting off the branch of pipe 56 leading to chamber 55 of pressure-reducing valve 47 and by connecting directly to air main 46 the branch of pipe 56 leading to admission chamber 10 of load-brake valve 1. However, through the pressure reducing valve it is possible to select in advance in this connection the brake stage which should become effective on spring-loaded device 5 immediately after the electrical brake is released. However, in the actuated state of the electric brake the pressure in spring-loaded cylinder 5 is monitored further by air main 46, because of the direct connection of load-brake valve 1 to air main 46, and it can be regulated by air main or immediately lowered automatically to the atmospheric pressure if the train becomes uncoupled.

It will be understood that this invention is susceptible to modification in order to adapt it to different usages and conditions, and accordingly, it is desired to comprehend such modifications within the invention as may fall within the scope of the appended claims..

What is claimed is:

1. In a load responsive air brake system for vehicles, particularly railway vehicles, comprising a main air line connected to a source of compressed air, a spring-loaded cylinder having a piston actuatable by a load responsive release pressure against the force of said spring, a load brake valve connected to said main air line so as to be operable thereby and having air passage means communicating with said cylinder, first and second control pistons in said load brake valve, a beam acted upon by said control pistons, a fulcrum upon which said beam is balanced, means for deplacing said fulcrum in response to the load on the vehicle, a control reservoir connected to said main air line and acting upon one side of said control pistons, means connecting the other side of said second piston to said spring-loaded cylinder, and a pressure reducing valve connected between said main air line and the other side of said first piston is subjected to a pressure proportional to the degree of braking.

2. In a load responsive air brake system as claimed in claim 1 and electrical means for controlling said pressure reducing valve to vary the pressure reducing effect thereof.

3. In a load responsive air brake system as claimed in claim 1 and valve means in the connection between said control reservoir and said main air line for maintaining said control reservoir at a constant working pressure.

4. In a load responsive air brake system as claimed in claim 3 wherein said valve means comprises a check valve opening in the direction to fill said control reservoir.

5. In a load responsive air brake system as claimed in claim 2 and solenoid valve means connected to the electrical brake control circuit of a vehicle for providing an air passage bypassing said pressure reducing valve.

6. In a load responsive air brake system as claimed in claim 4 wherein the hold-back pressure of said check valve has substantially the same relationship to the full pressure of the main air line as the difference between the surfaces of a control piston to the head piston surface of such a control piston acted upon by the pressure of the control reservoir.

* * * * *